(12) United States Patent
Rapaport et al.

(10) Patent No.: US 7,494,735 B2
(45) Date of Patent: Feb. 24, 2009

(54) FUEL CELL STACK DESIGN AND METHOD OF OPERATION

(75) Inventors: Pinkhas A Rapaport, Fairport, NY (US); Jeffrey A Rock, Fairport, NY (US); Andrew D Bosco, Rochester, NY (US); John P Salvador, Penfield, NY (US); Lesley A Paine, Rochester, NY (US); Hubert A Gasteiger, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 294 days.

(21) Appl. No.: 10/917,038

(22) Filed: Aug. 12, 2004

(65) Prior Publication Data

US 2005/0019648 A1     Jan. 27, 2005

Related U.S. Application Data

(63) Continuation-in-part of application No. 10/230,916, filed on Aug. 29, 2002, now Pat. No. 6,794,068.

(51) Int. Cl.
*H01M 8/04* (2006.01)
(52) U.S. Cl. .............................. 429/38; 429/32; 429/39
(58) Field of Classification Search ........................ None
See application file for complete search history.

(56) References Cited

U.S. PATENT DOCUMENTS

| | | | |
|---|---|---|---|
| 3,711,333 A * | 1/1973 | Kohlmuller | 429/23 |
| 3,935,028 A | 1/1976 | Strasser et al. | |
| 4,080,487 A | 3/1978 | Reiser | |
| 4,722,873 A | 2/1988 | Matsumura | |
| 5,272,017 A | 12/1993 | Swathirajan et al. | |
| 5,316,871 A | 5/1994 | Swathirajan et al. | |
| 5,413,878 A | 5/1995 | Williams et al. | |
| 5,478,662 A | 12/1995 | Strasser | |
| 5,518,828 A | 5/1996 | Senetar | |
| 5,763,113 A | 6/1998 | Meltser et al. | |
| 5,776,624 A | 7/1998 | Neutzler | |
| 6,110,612 A | 8/2000 | Walsh | |
| 6,218,038 B1 | 4/2001 | Oko et al. | |
| 6,251,534 B1 | 6/2001 | McElroy | |

(Continued)

OTHER PUBLICATIONS

International Search Report—International Application No. PCT/US03/26041.

*Primary Examiner*—John S Maples (57) ABSTRACT

A hydrogen fuel cell stack has at least two segments of fuel cells each having reactant gas passages. The reactant gas passages of each fuel cell in each segment are arranged in parallel with each other. Flow of fuel cell fluids is in a gravity assisted downward direction. Gravity assisted flow directs water formed in each cell to lower removal points of the stack segments. Adjacent segments are separated by either a separator segment formed as an integral unit with the stack or the segments are joined and an external piping system directs flow to differing stack areas. A cathode flow enters at a first stack end and a hydrogen anode flow enters the stack at an opposite end, such that cathode and anode flows are counter-current to each other. A coolant flow is normally injected adjacent to and flows parallel with the cathode flow, but can also be directed by the piping system to any or all segments in series or parallel.

9 Claims, 8 Drawing Sheets

U.S. PATENT DOCUMENTS

| | | | |
|---|---|---|---|
| 6,524,735 B1 * | 2/2003 | Wariishi et al. | 429/39 |
| 7,169,491 B2 * | 1/2007 | Schafer | 429/17 |
| 2001/0005557 A1 * | 6/2001 | Yosida et al. | 429/32 |
| 2003/0022050 A1 | 1/2003 | Barton et al. | |
| 2003/0207165 A1 | 11/2003 | Skala et al. | |
| 2005/0014044 A1 * | 1/2005 | Thirukkovalur et al. | 429/26 |
| 2005/0014059 A1 * | 1/2005 | Kaye | 429/38 |

* cited by examiner

FUEL CELL STACK DESIGN AND METHOD OF OPERATION

CROSS-REFERENCE TO RELATED APPLICATIONS

This application is a continuation-in-part of U.S. patent application Ser. No. 10/230,916 filed on Aug. 29, 2002 now U.S. Pat. No. 6,794,068. The disclosure of the above application is incorporated herein by reference.

FIELD OF THE INVENTION

The present invention relates to fuel cell systems, and more specifically to a system and method to operate a fuel cell stack with a hydrogen reactant.

BACKGROUND OF THE INVENTION

Fuel cells have been used as a power source in many applications. In the "pure hydrogen" type of proton exchange membrane (PEM) fuel cells, a hydrogen reactant (i.e., a reactant having a hydrogen concentration of approximately 80% by volume or greater) is supplied to the anode sides of the fuel cell, and oxygen is supplied as the oxidant to the cathode sides. Each cell within the stack includes a membrane electrode assembly (MEA) which provides its increment of voltage. MEAs include a thin, proton transmissive, non-electrically conductive solid polymer electrolyte membrane having the anode catalyst on one of its faces and a cathode catalyst on the opposite face. The term "fuel cell" is typically used to refer to either a single cell or a plurality of cells (stack) depending on the context. A plurality of individual cells are commonly bundled together to form a fuel cell stack.

In practice, the reactants are supplied to the fuel cells through individual inlet manifolds and headers. In the inlet header the reactant, for instance the anode flow, is divided in a number of flow paths feeding individual cells. The exhaust flow leaves the cells, mixes in an outlet header and exits the stack through an outlet manifold. A coolant is also provided to each segment to remove heat generated by the reduction of reactants. In at least one known design, the anode sides of all cells are fed in parallel, i.e., they have the same inlet hydrogen concentration.

A disadvantage of parallel feeding a single group of cells is that the fuel cell stack is unable to stably operate at low stoichiometry; that is, near the mass flow of reactants needed to satisfy a given power output. It is therefore difficult to achieve efficient hydrogen or oxygen utilization. As a result, system efficiency is not optimized.

Stack designs which partially correct the above situation are known, such as the stack design of U.S. Pat. No. 5,478,662 issued to Strasser. In stacks such as the Strasser design, individual groups of parallel cells are arranged wherein the flow within each cell of each group is in parallel, and all the flow from each group flows between groups in series. The number of individual fuel cells normally varies in these stack designs wherein the initial or upstream segments of cells contain the largest number of individual fuel cells and each successive segment provides a reduced quantity of fuel cells. With this type of configuration the last segment of the set of segments normally has the fewest number of individual fuel cells.

The above series/parallel stack designs normally provide a serpentine type flow pattern throughout the stack. A serpentine flow path results in both anode and cathode side reactant flows which are either horizontal throughout the stack, or that must overcome gravity for one or more individual segments. Water build-up in the lower portions of the stack inhibits reactant contact with the catalyst materials of the fuel cells, thus decreasing stack efficiency.

A further drawback of known fuel cell stack designs is the inability to control coolant supply and coolant supply locations. Common hydrogen reactant fuel cell stacks do not provide for stack humidity control by directing coolant to specific locations of the stack.

SUMMARY OF THE INVENTION

The above drawbacks for fuel cell stacks are overcome by a stack design and method of operation for a hydrogen reactant system of the present invention. The stack design of the present invention incorporates individual segments of fuel cell elements arranged in equivalent or different quantities of fuel cell elements within each segment. Each segment is arranged to provide flow within each fuel cell in a gravity assisted direction. This arrangement increases the stability of the fuel cell stack operation by allowing the entire volume of either the anode side or cathode side, or both flows, to be distributed through segments of the stack wherein only a portion of the total number of the cells are present.

In a preferred embodiment, the cathode reactant and the coolant enter the upper portion of a first segment preferably having a greatest percentage of stack fuel cells. Flow through the first segment is in parallel through each cell and the cathode reactant exits at the bottom of the stack segment and is collected and transferred to the second segment of the stack through a separator channel disposed within the separator segment. Excess water generated through any of the cathode fuel cells collects and is discharged at the bottom of each separator segment. The hydrogen reactant enters an upper portion of a segment furthest downstream from the cathode reactant entry point and flows in a "counter-current" stack segment direction relative to both the cathode and coolant. The downstream segment(s) can have either the same or a reduced quantity of stack fuel cells compared to the first segment. Anode flow through the second segment exits at the bottom of this stack segment and is collected and transferred to the first segment of the stack through a separator channel disposed in a separator segment.

With the counter-current flow arrangement, cathode side humidity is controlled by routing the cathode flow (where most of the water is generated) adjacent to the coolant at its coldest relative temperature throughout the stack. Hydrogen side humidity is controlled by routing the hydrogen reactant into the stack at the location where the coolant is warmest. The hydrogen side therefore gradually absorbs water across the MEAs to maintain a minimum humidity level which protects the MEAs.

Each segment is arranged to provide downward or gravity assisted flow through each cell such that excess water collects at the stack lower sections where it is drained. Each segment provides fuel cells arranged approximately in parallel to each other and arranged for gravity assisted flow through each cell of the segment.

In another preferred embodiment, a separator segment is disposed between each stack segment wherein all of the flow exiting the preceding segment is routed through the separator segment. The separator segments are disposed between a pair of bipolar plates lacking an MEA. The purpose of the separator segments is to redirect all the flow from the outlet of one segment into the inlet of the next succeeding segment without reacting the fuel source and therefore generating no additional water. Each separator segment is a structural member adjoining individual segments of fuel cell elements. A separate separator segment is provided between each segment of fuel cells to separately redirect flow between individual flow groups, i.e., anode, cathode and coolant. The flow exiting each flow segment is collected at a lower section of that stack segment and redirected generally upwardly to a top inlet of the next succeeding segment. This provides flow through the individual fuel cell segments in a gravity assisted direction, i.e., vertically downward. Flow in each segment of cells is parallel throughout each of the fuel cells of the segment.

The separator segment and the gravity assisted orientation of fuel cells features of the present invention are based on similar features disclosed in co-pending United States patent application entitled "Cascaded Fuel Cell Stack", Ser. No. 10/230,916, filed Aug. 29, 2002, which is incorporated herein by reference.

In another preferred embodiment of the present invention, individual sets of external piping and valves replace each separator segment. Flow is preferably directed in series between segments by collection at the segment lower portion and directing it to the next segment at an upper portion, similar to the separator segments discussed above. By using an external valve and piping system in place of the separator segments, however, adjustment of the valves provides the additional options of directing a mixture of series/parallel flow between segments or directing the conventional total parallel flow to each segment.

In a further preferred embodiment of the present invention, parallel flow of coolant through the individual segments is provided. The coolant flow is split prior to entry into the stack such that a first portion of the coolant flow enters the stack at the general location where cathode reactant enters the stack, and the first portion of coolant flow generally follows the cathode stream flow. A second portion of coolant flow enters the stack at the general location where the anode reactant enters the stack, and the second portion of coolant generally follows the anode stream flow. By providing parallel flow of coolant, each reactant gas at the stack entry point is cooled by the coolant at the lowest coolant temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
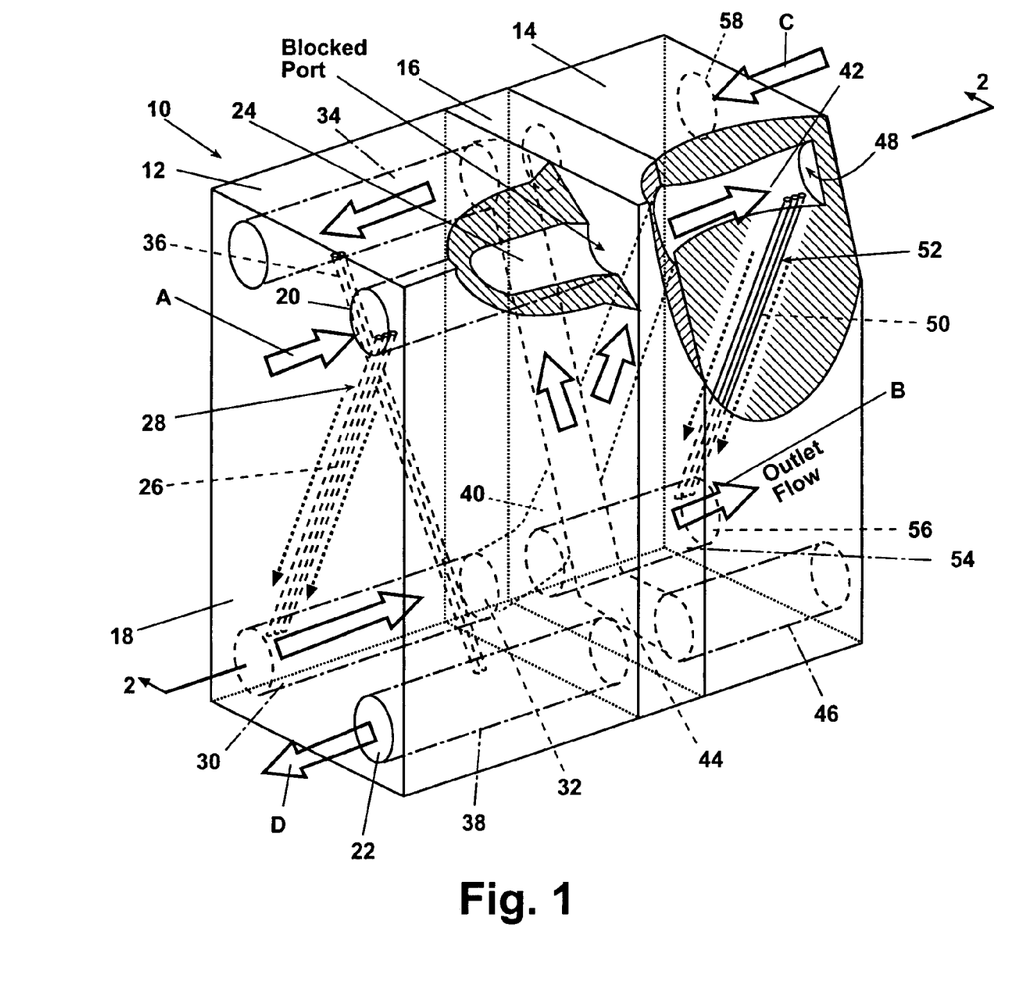
FIG. 1 is a perspective view providing a preferred embodiment of the present invention having cross flow of reactants, a first segment where a cathode reactant and a coolant enter the stack, and a second segment where a hydrogen reactant enters the stack.

Referring to FIG. 1, a preferred embodiment of the present invention is shown. A cascaded fuel cell stack 10 includes a first segment 12 separated from a second segment 14 by a separator segment 16. Reactant flow within the flow channels of the separator segment 16 is in a "cross flow" configuration as further defined below. An outer face 18 of the first segment 12 includes a cathode inlet 20 and an anode outlet 22. The cathode inlet 20 is in fluid communication with a cathode inlet chamber 24. The cathode inlet chamber is connected to a plurality of cathode side fuel cell passages 26 of a plurality of fuel cells 28. The cathode side fuel cell passages 26 each connect to a cathode exit chamber 30 which ends at a cathode outlet 32.

An anode inlet chamber 34 is in fluid communication with a plurality of anode side fuel cell passages 36 of the fuel cells 28. The anode side fuel cell passages 36 each connect to an anode exit chamber 38 which discharges anode flow at the anode outlet 22.

The separator segment 16 mechanically and fluidly connects the first segment 12 to the second segment 14. The separator segment 16 includes a cathode passage 40 connecting the cathode outlet 32 to a cathode inlet chamber 42 of the second segment 14. The separator segment 16 also includes an anode passage 44 connecting the anode inlet chamber 34 to an anode exit chamber 46 of the second segment 14. A coolant passage is not shown in the separator segment 16 for clarity.

The second segment 14 also includes a blocked port 48 which provides a boundary for the cathode inlet chamber 42. The cathode inlet chamber 42 is in fluid communication with a plurality of cathode side fuel cell passages 50 of a plurality of second segment fuel cells 52. The cathode side fuel cell passages 50 each connect to a cathode exit chamber 54 which discharges cathode flow at a cathode outlet 56. Anode inlet flow in the second segment 14 is similar to the cathode inlet flow described for the first segment 12 and is therefore not shown for clarity. Coolant passages are also not shown in the second segment 14 for clarity.

An exemplary flow of cathode gas enters at an upper portion of the first segment 12 as indicated by a flow arrow A at the cathode inlet 20. From the cathode inlet 20, cathode gas is distributed into the cathode inlet chamber 24. The distal end of the cathode inlet chamber 24 is blocked by the separator segment 16, forcing all flow within the cathode inlet chamber 24 into the cathode side fuel cell passages 26 of the fuel cells 28. All of the cathode flow downwardly traverses the cathode side fuel cell passages 26 and discharges into the cathode exit chamber 30. From the cathode exit chamber 30, the flow exits the first segment 12 through the cathode outlet 32 and enters the cathode passage 40 of the separator segment 16. The cathode passage 40 redirects the flow upwards to the cathode inlet chamber 42 of the second segment 14. A distal end of the cathode inlet chamber 42 is blocked by either the blocked port 48 or an additional separator segment (not shown), forcing all flow within the cathode inlet chamber 42 into the cathode side fuel cell passages 50 of the second segment fuel cells 52. All of the flow from the cathode inlet chamber 42 downwardly traverses the cathode side fuel cell passages 50 and discharges into the cathode exit chamber 54 and out of the cascaded fuel cell stack 10 at the cathode outlet 56 as shown by the flow arrow B. Anode flow enters the second segment 14 at the anode inlet 58 in the direction of flow arrow C. Anode flow within the second segment 14 is similar to anode flow in the first segment 12 and is therefore not shown for clarity.

As best shown in FIG. 1, for the exemplary first segment 12, the cathode inlet chamber 24 and the anode inlet chamber 34 are preferably positioned on an opposite side of the first segment 12. Cathode gas flow through the fuel cells 28 is diagonally downward as shown. Anode gas flow is also diagonally downward from the anode inlet chamber 34 to the anode exit chamber 38 such that anode and cathode flow are in a "cross flow" configuration with respect to each other. In another preferred embodiment (not shown), both the cathode inlet chamber 24 and the anode inlet chamber 34 are positioned in an adjacent, side by side arrangement in the first segment 12. In this embodiment, both the anode flow and the cathode flow are in a "parallel flow" configuration with respect to each other, e.g., from the upper left to the lower right viewed from the outer face 18. In both embodiments of anode/cathode flow, i.e., both "cross flow" and "parallel flow", both the anode flow and cathode flow are always in the unidirectional, generally downward, gravity assisted flow direction within each fuel cell with respect to the first segment 12 and the second segment 14.

Figure 2:
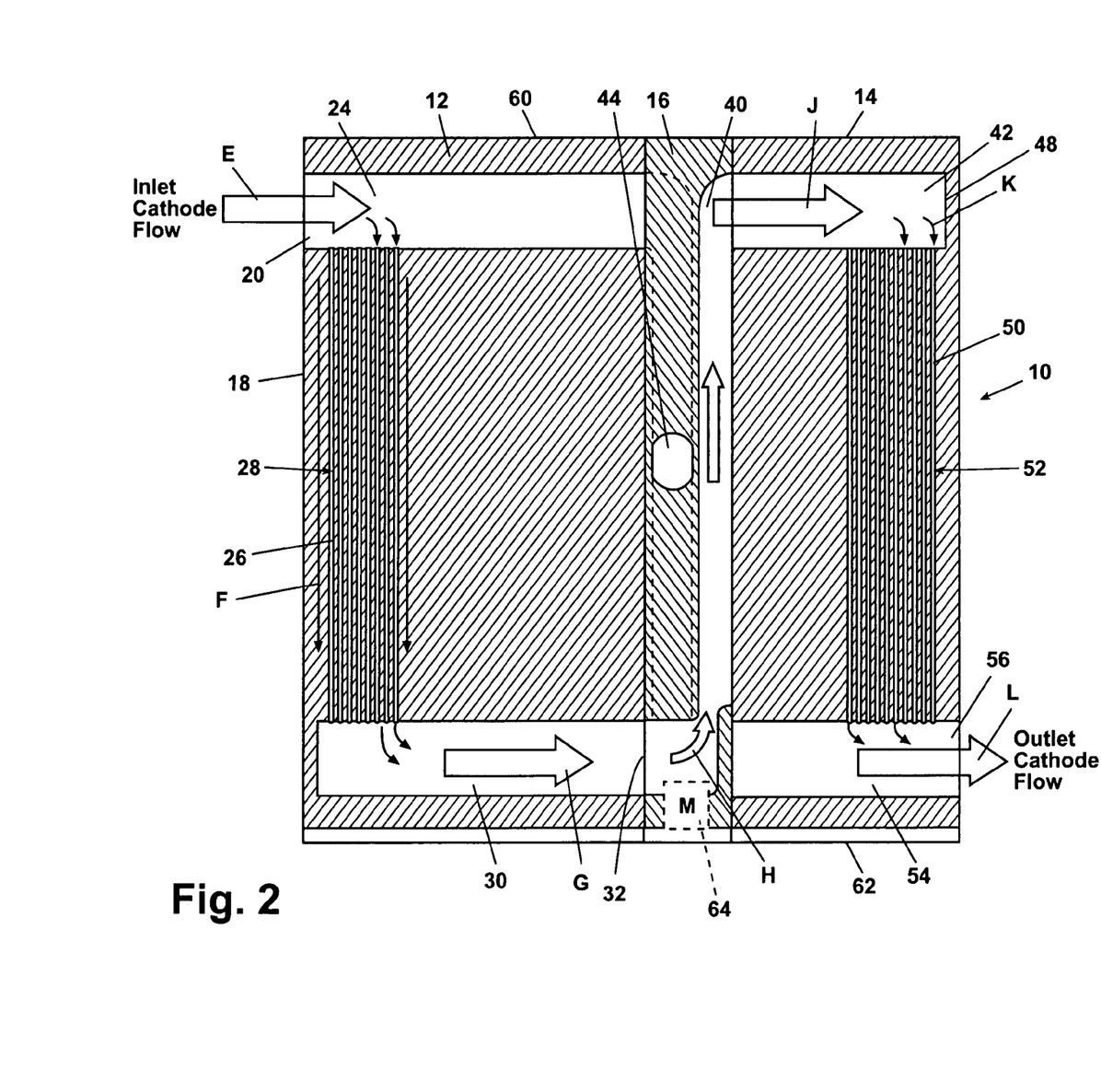
FIG. 2 is a sectioned elevation view through section 2 of FIG. 1, showing a cathode flow through a two segment fuel cell stack.

Referring to FIG. 2, a cross section of the cascaded fuel cell stack 10 of FIG. 1 identifies an exemplary cathode reactant flow from the larger, upstream first segment 12 to the smaller, downstream second segment 14. As defined herein, a "larger" segment of a fuel cell stack contains a greater quantity of fuel cells than a "smaller" segment. An upstream segment refers to a first segment preceding a second segment with respect to a particular reactant flow. Coolant and anode (i.e., hydrogen) reactant flows are not shown in FIG. 2 for clarity.

The first segment 12 includes the cathode inlet chamber 24 in fluid communication with the fuel cells 28. Each of the fuel cells 28 are disposed approximately in parallel to each other and each discharges into the cathode exit chamber 30. The cathode exit chamber 30 is in fluid communication with the separator segment 16. The separator segment 16 both mechanically and fluidly joins the first segment 12 to the second segment 14. The cathode passage 40 provides fluid communication between the cathode exit chamber 30 and the cathode inlet chamber 42 of the second segment 14. A portion of the anode passage 44 is also shown adjacent to the cathode passage 40 in the section view of FIG. 2. As best shown in FIG. 1, the anode passage 44 slopes continuously upward within the separator segment 16 to fluidly connect the anode exit chamber 46 of the second segment 14 to the anode inlet chamber 34 of the first segment 12.

The cathode inlet chamber 24 is in fluid communication with the cathode side fuel cell passages 50 of the second segment fuel cells 52. Each of the second segment fuel cells 52 are disposed approximately in parallel to each other and each discharges into the cathode exit chamber 54. In the exemplary embodiment shown, the cathode exit chamber 54 collects and discharges all cathode flow from the cascaded fuel cell stack 10.

The segments of each fuel cell stack of the present invention are arranged as successive pairs of segments. In the simplified exemplary embodiment shown in FIGS. 1 and 2, the first segment 12 forms a first segment pair with the second segment 14. If a third, or more segment is added, the second segment 14 forms a second segment pair with the third segment (not shown) and so forth.

A cathode reactant flow (shown) enters the cascaded fuel cell stack 10 in the cathode inlet flow direction A. From the cathode inlet chamber 24, the cathode reactant flow is redirected into each of the cathode side fuel cell passages 26 of the fuel cells 28 in a first segment gravity assisted flow direction F as shown. All of the cathode reactant inlet flow to the cascaded fuel cell stack 10 traverses the fuel cells 28. The discharge from the fuel cells 28 is redirected in the cathode exit chamber 30 in a first segment exit direction G.

All of the cathode reactant flow exiting the first segment 12 enters the cathode passage 40 of the separator segment 16 and is redirected in a generally upward flow direction H. From the cathode passage 40, all of the cathode reactant flow is again redirected in a second segment inlet flow direction J into the cathode inlet chamber 42 of the second segment 14. From the cathode inlet chamber 42, the cathode reactant flow is redirected from the second segment inlet flow direction J to a second segment gravity assisted flow direction K. All of the cathode reactant flow in the second segment 14 flows within the cathode side fuel cell passages 50 of the second segment fuel cells 52. The cathode side fuel cell passages 50 each discharge and form a combined flow in the cathode exit chamber 54. The combined flow in the cathode exit chamber 54 exits the cascaded fuel cell stack 10 in a stack outlet flow direction L.

The cascaded fuel cell stack 10 provides an advantage in that each reactant gas flow through all of the fuel cells is arranged to flow in a downward or gravity assisted direction shown by the exemplary first segment gravity assisted flow direction F and as the exemplary second segment gravity assisted flow direction K, respectively. By providing flow through active fuel cells only in the gravity assisted direction, water generated by the reaction process in the exemplary fuel cells 28 and 52 is forced, both by the flow velocity of the cathode reactant gas through the fuel cells and gravity, into the first and second segment cathode exit chambers 30 and 54, respectively. By disposing the separator segment 16 between the first segment 12 and the second segment 14 as shown, the separator segment 16 reaches an average operating temperature of the stack by both conductive heat transfer and convective heat transfer from the stack segments and the coolant.

In use, the exemplary two segment, cascaded fuel cell stack 10 of FIG. 2 is configured to provide a stack upper portion 60 wherein the cathode inlet 20 is disposed adjacent thereto. A stack lower portion 62 is also identified wherein the cathode outlet 56 is disposed adjacent thereto. Cathode reactant gas flow is directed to enter the cathode inlet 20 in the stack upper portion 60, is redirected upward by each separator segment (e.g., separator segment 16) and flows in the gravity assisted downward flow direction through each fuel cell of the cascaded fuel cell stack 10 to exit from the cathode outlet 56 at the stack lower portion 62. An anode flow through the cascaded fuel cell stack 10 is similar.

By directing water which is generated by the reaction process of a fuel cell to the stack lower portion, the water is advantageously discharged. In the embodiment of FIG. 2 of the present invention, water is discharged from the cascaded fuel cell stack 10 by a drain (not shown) which is connected to a separator drain area M of a lower separator segment 64. If more than one separator segment is used, (e.g., for a three or more segment stack) each separator segment has a drain area similar to separator drain area M at the lower separator segment 64. The location of the water drain in the separator drain area M provides for discharge of a predominate portion of the water generated by the fuel cells 28 of the first segment 12. Relative humidity is controlled between segments at approximately 100% relative humidity by removing all or most of the water which is at a due point above a coolant water temperature, prior to entering the next segment.

Figure 3:
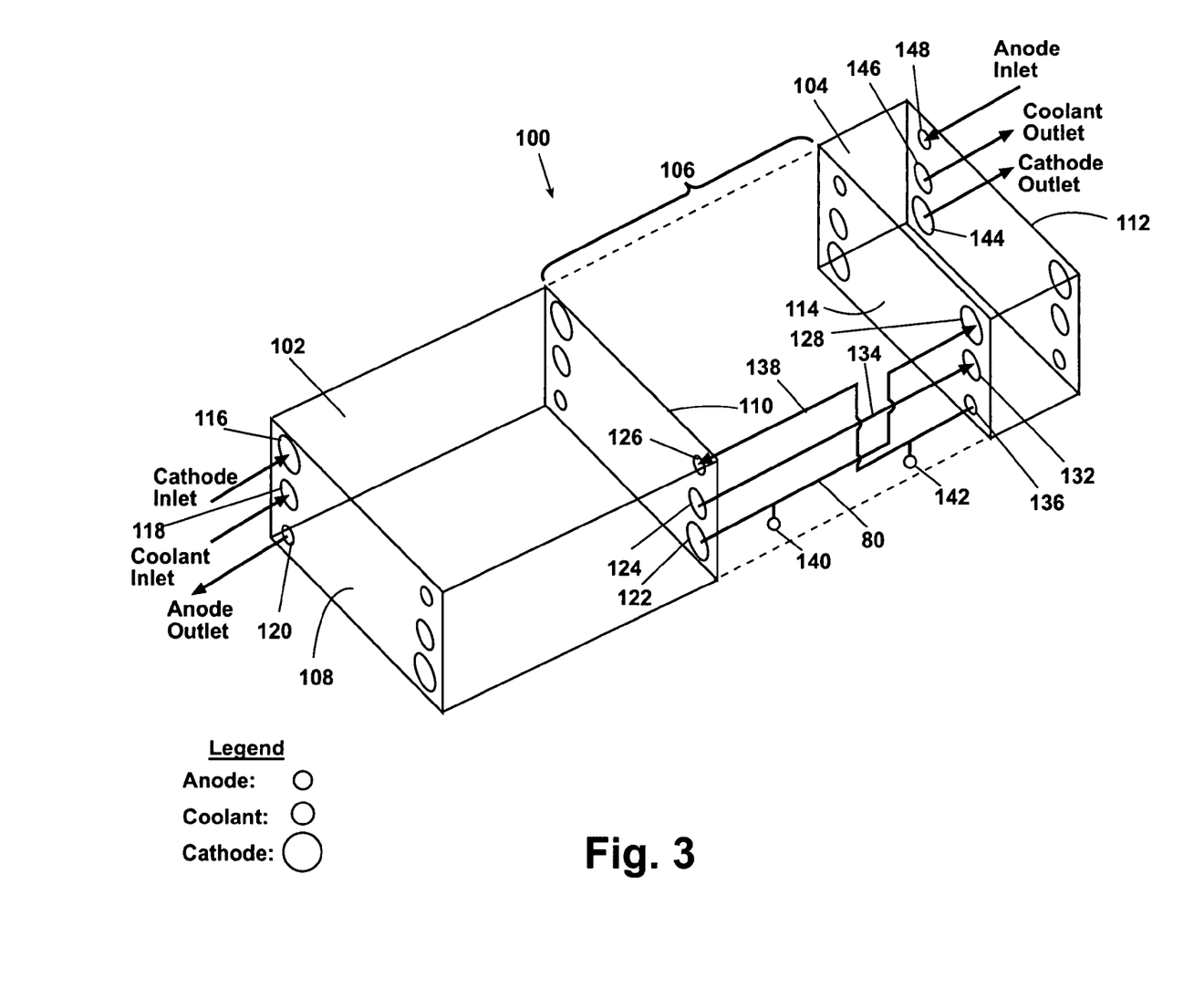
FIG. 3 is a perspective view of another preferred embodiment of the present invention showing a cathode, a coolant and an anode flow through a two segment fuel cell stack, having an external piping arrangement replacing the separator segment of FIG. 1.

Referring to FIG. 3, another preferred embodiment of the present invention is shown which includes a set of piping to direct anode, cathode and coolant flow between a pair of adjacent stack segments in place of the separator segment 16 shown in FIG. 1. In a fuel cell stack 100, a first segment 102 is separated from a second segment 104 by a piping set 106. The first segment 102 includes a first segment outer face 108 and a first segment inner face 110. The second segment 104 similarly includes a second segment outer face 112 and a second segment inner face 114. The first segment outer face 108 provides a first segment cathode inlet 116, a first segment coolant inlet 118, and a first segment anode outlet 120. The first segment inner face 110 provides a first segment cathode outlet 122, a first segment coolant outlet 124, and a first segment anode inlet 126.

The first segment cathode outlet 122 fluidly communicates with a second segment cathode inlet 128 via a cathode pipe 130. The first segment coolant outlet 124 fluidly communicates with a second segment coolant inlet 132 via a coolant pipe 134. The first segment anode inlet 126 receives anode reactant flow from a second segment anode outlet 136 via an anode pipe 138. Excess water entrained in both the cathode reactant and the anode reactant is drained between the first segment 102 and the second segment 104 by each of a cathode pipe drain 140 and an anode pipe drain 142, respectively. Each of the second segment cathode inlet 128, the second segment coolant inlet 132, and the second segment anode outlet 136 are disposed on the second segment inner face 114. The second segment outer face 112 includes a second segment cathode outlet 144, a second segment coolant outlet 146, and a second segment anode inlet 148.

Cathode flow enters an upper portion of the first segment 102 at the first segment cathode inlet 116, flows through a plurality of first segment fuel cells (not shown) in a generally gravity assisted direction, is collected and exits at the first segment cathode outlet 122 located on a lower portion of the first segment 102. The cathode pipe 130 carries the cathode flow in a generally upward direction to the second segment cathode inlet 128. The second segment cathode inlet 128 is located on an upper portion of the second segment inner face 114 of the second segment 104. From the second segment cathode inlet 128 the cathode flow is directed to a plurality of second segment fuel cells (not shown), is collected and exits a lower portion of the second segment 104 at the second segment cathode outlet 144.

Coolant flow enters the first segment 102 at the first segment coolant inlet 118, flows through a plurality of coolant flow channels (not shown) and exits the first segment 102 at the first segment coolant outlet 124. The coolant pipe 134 carries the coolant to the second segment coolant inlet 132. Coolant flow enters the second segment 104, flows through a plurality of coolant flow channels (not shown) and exits the second segment 104 at the second segment coolant outlet 146.

Anode flow enters the fuel cell stack 100 at an upper portion of the second segment outer face 112, into the second segment 104, at an opposite downstream location from the cathode flow. In a preferred embodiment of the present invention, anode flow is directed preferably into a fuel cell segment containing an equivalent quantity of fuel cells as the cathode flow entry segment, or a smaller fuel cell segment containing a lower quantity of fuel cells compared to where the cathode flow enters the fuel cell stack 100. In the exemplary embodiment of FIG. 3, anode flow enters an upper portion of the second segment 104 at the second segment anode inlet 148, flows through the plurality of second segment fuel cells (not shown) in a generally gravity assisted direction, is collected and exits at the second segment anode outlet 136 located on a lower portion of the second segment 104. The anode pipe 138 carries the anode flow in a generally upward direction to the first segment anode inlet 126. The first segment anode inlet 126 is located on an upper portion of the first segment inner face 110. From the first segment anode inlet 126, the anode flow is directed to the plurality of first segment fuel cells (not shown), is collected and exits a lower portion of the first segment 102 at the first segment anode outlet 120.

Figure 4:
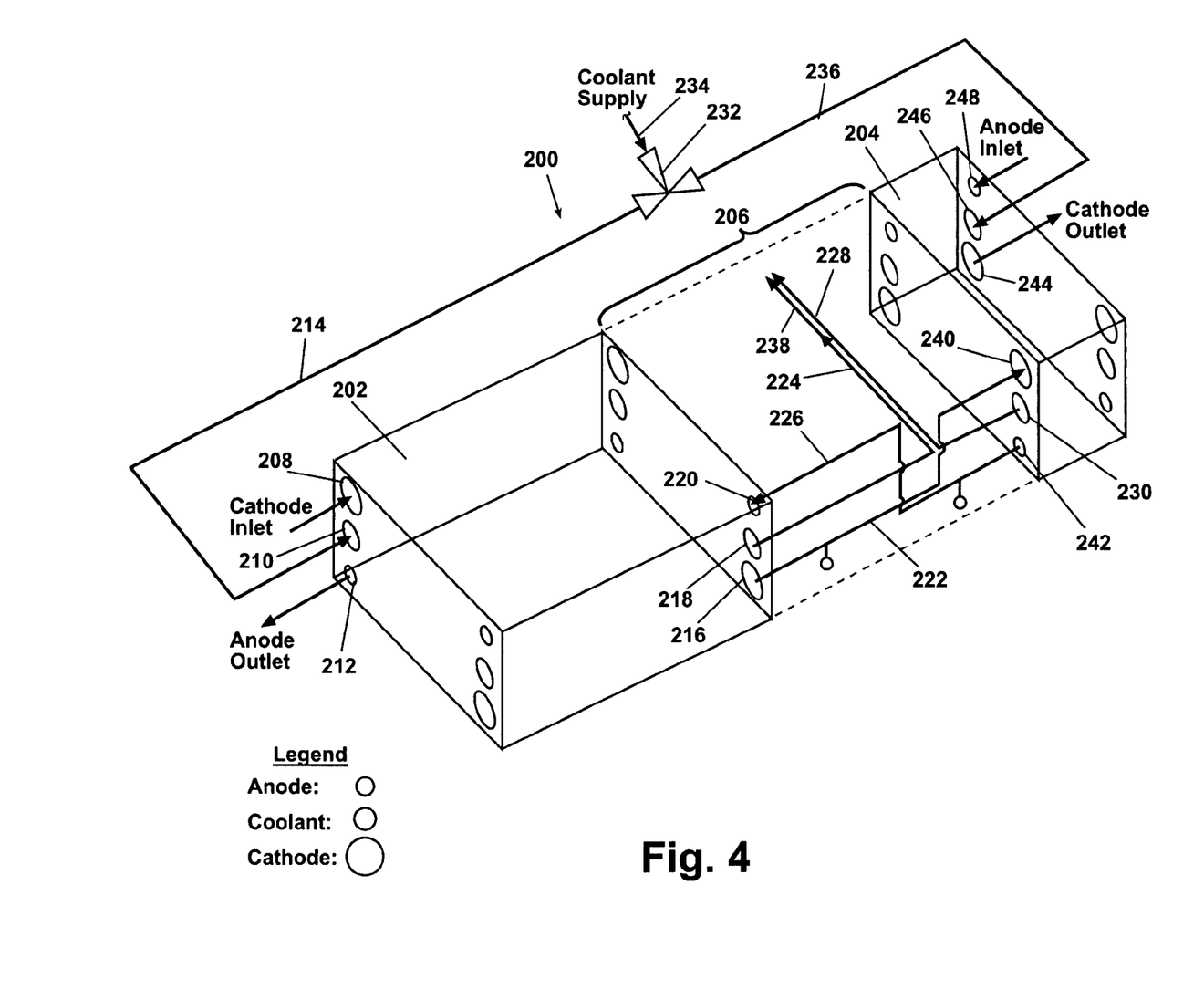
FIG. 4 is a block diagram similar to FIG. 3 of a two segment stack of the present invention having a parallel coolant flow supporting a countercurrent anode to cathode flow through the stack segments.

Referring now to FIG. 4, a fuel cell stack 200 is similar to the fuel cell stack in FIG. 3, therefore only the differences will be discussed. The fuel cell stack 200 includes a first segment 202 and a second segment 204. A piping set 206 fluidly joins the first segment 202 to the second segment 204. A cathode flow enters the first segment at a cathode inlet 208, a coolant flow enters at a coolant inlet 210, and an anode flow exits the first segment (and the fuel cell stack 200) at an anode outlet 212. Coolant is supplied to the coolant inlet 210 by a first segment coolant supply pipe 214. Cathode flow exits the first segment 202 at a cathode outlet 216. The coolant flow provided to the coolant inlet 210 exits the first segment 202 at a coolant outlet 218. The anode flow to the first segment 202 is provided at an anode inlet 220.

Flow between the first segment 202 and the second segment 204 is provided through the piping set 206. A cathode flow pipe 222 directs cathode flow in a generally upward direction from the first segment 202 to the second segment 204. A coolant flow pipe 224 discharges coolant flow from the first segment 202 of the fuel cell stack 200. An anode flow pipe 226 directs anode flow discharged from the second segment 204 in a generally upward direction to the anode inlet 220 of the first segment 202. The piping set 206 also provides a coolant discharge pipe 228 which collects coolant discharged from the second segment at a coolant outlet 230. A coolant control valve 232 directs coolant supplied by a coolant supply line 234 to the first segment coolant supply pipe 214 and to a second segment coolant supply pipe 236. The coolant flow pipe 224 and the coolant discharge pipe 228 both discharge into a combined coolant return pipe 238 which returns the coolant to the coolant source (not shown).

At the second segment 204, the cathode flow pipe 222 discharges into a cathode inlet 240, and the anode flow pipe 226 receives anode flow from an anode outlet 242. Cathode flow discharges from the fuel cell stack 200 at a cathode outlet 244. The second segment coolant supply pipe 236 supplies a portion of the total stack coolant flow to a coolant inlet 246. An anode inlet 248 receives the anode flow for the fuel cell stack 200.

The piping set 206 provides coolant at its lowest temperature to each of the locations where the cathode flow and the anode flow enter the fuel cell stack 200. This provides the lowest dew point for both the entering cathode flow and the anode flow, which improves relative humidity control for the fuel cell stack 200. The coolant control valve 232 can also be replaced by individual throttling valves or other flow control devices (e.g., orifices) in each of the first segment coolant supply pipe 214 and the second segment coolant supply pipe 236 to assist in proportioning the coolant flow to the segments of the fuel cell stack 200.

Figure 5:
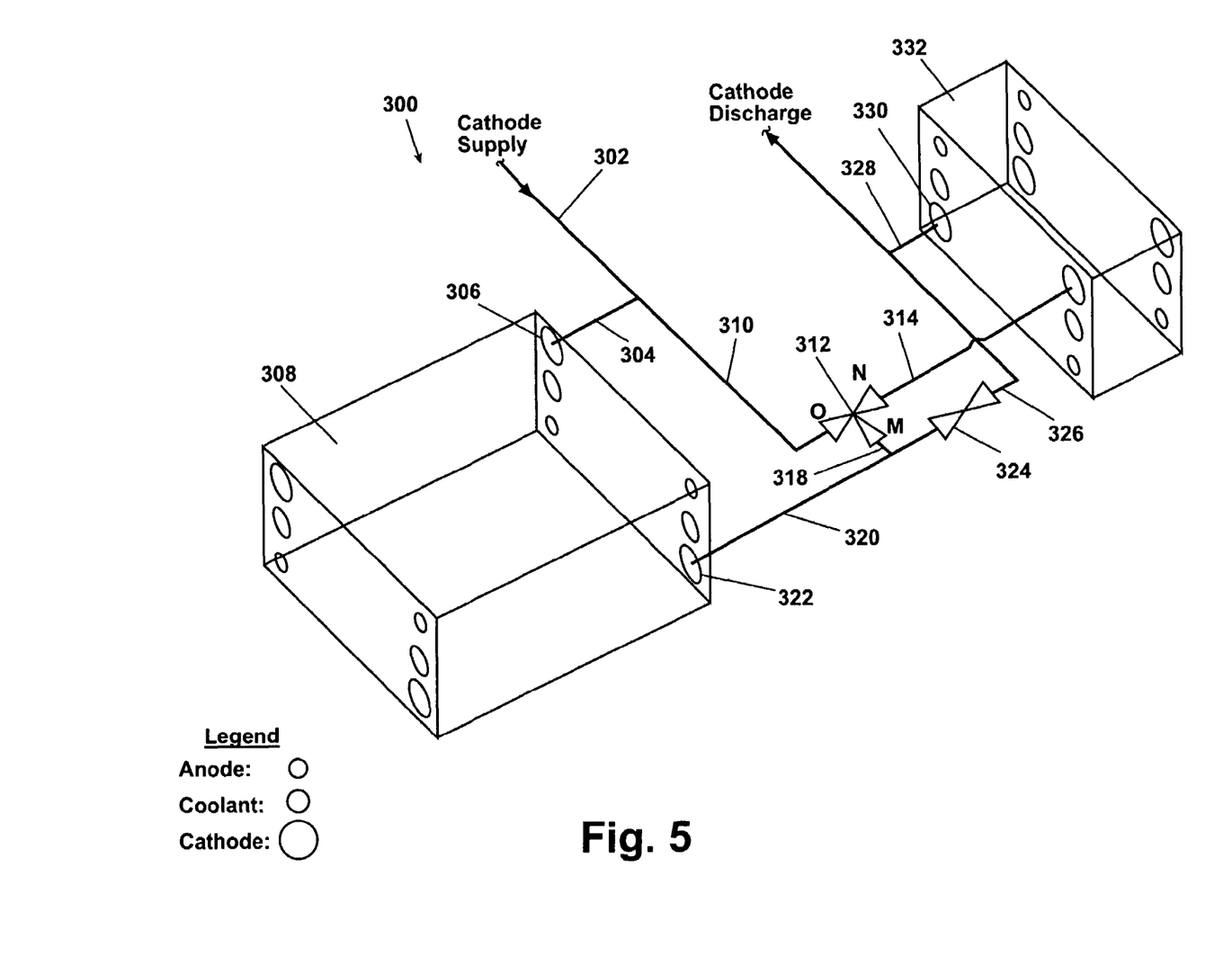
FIG. 5 is a block diagram of a two segment fuel cell stack similar to FIG. 3, having a piping and valve arrangement in place of a separator segment, showing an arrangement of valves and piping to provide either series or parallel cathode flow between stack segments.
Figure 6:
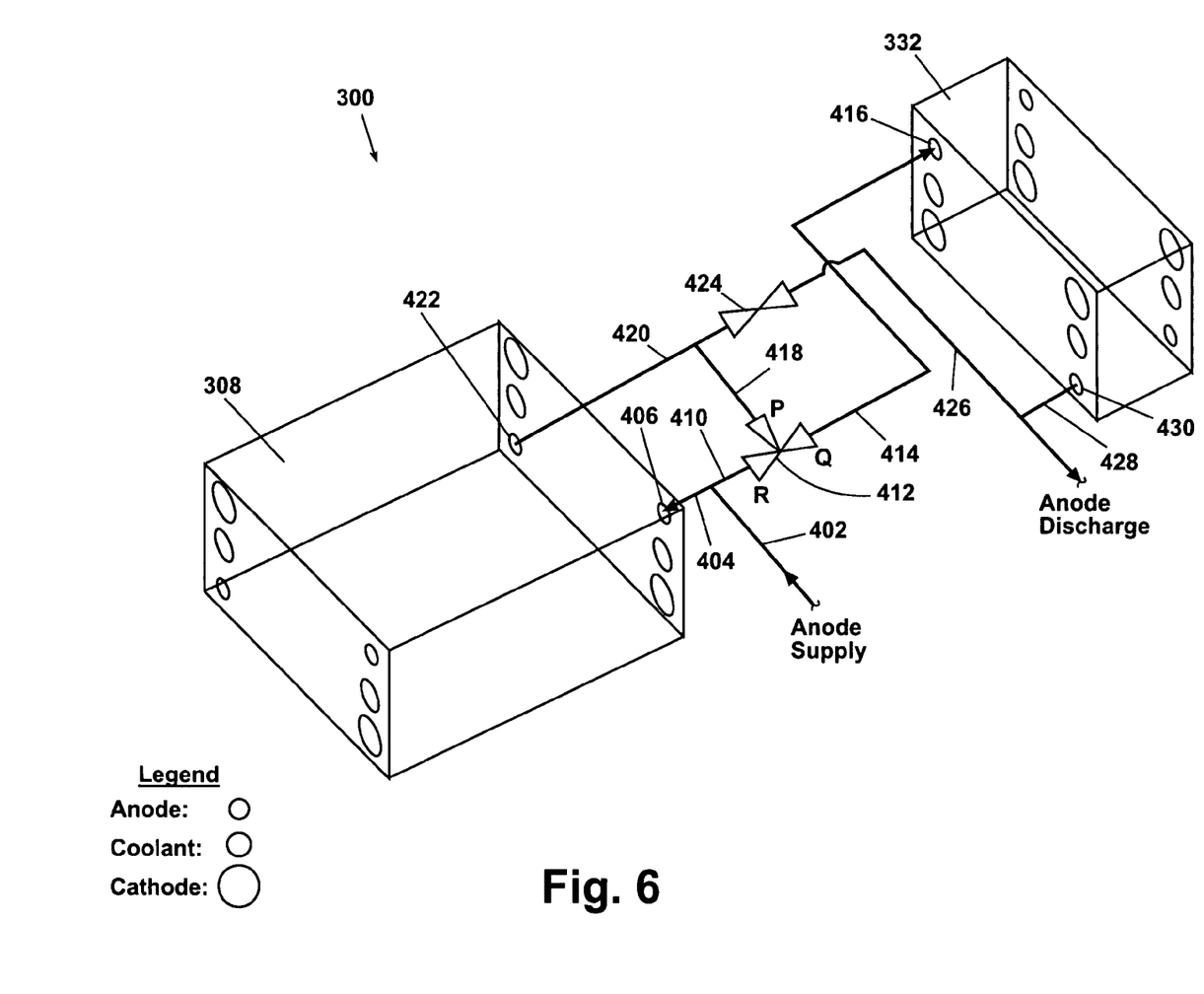
FIG. 6 is the fuel cell stack of FIG. 5, showing an arrangement of valves and piping to provide either series or parallel anode flow between stack segments.
Figure 7:
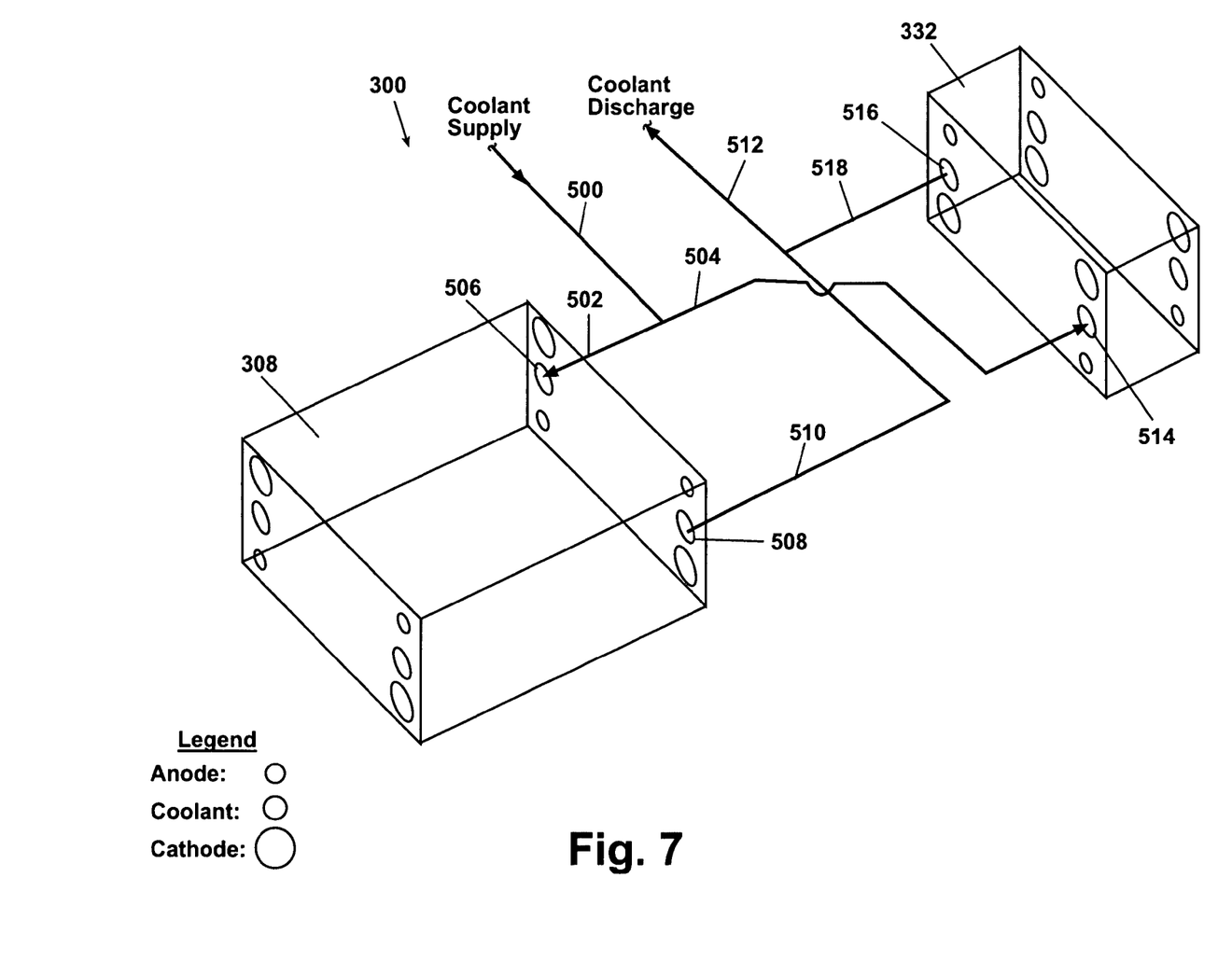
FIG. 7 is the fuel cell stack of FIG. 5, showing piping providing parallel coolant flow between stack segments.

Referring now to FIGS. 5, 6, and 7, yet another embodiment for a fuel cell stack of the present invention is shown. FIG. 5 identifies cathode piping and valves between segments of an exemplary two segment fuel cell stack 300. FIG. 6 identifies anode piping and valves between segments of the fuel cell stack 300. FIG. 7 identifies coolant piping between segments of the fuel cell stack 300. The piping and valves of FIGS. 5, 6, and 7 are shown separately for clarity, but in use the piping and valves are combined between the two segments of the fuel cell stack 300.

As shown in FIG. 5, the fuel cell stack 300 includes piping and valves which are configurable to provide either series or parallel cathode flow through a two segment stack. A cathode supply pipe 302 supplies cathode flow to a first segment inlet pipe 304, which is connectable to a cathode inlet 306 of a first segment 308. The cathode supply pipe also supplies cathode flow to a first segment bypass pipe 310 which can provide a partial bypass cathode flow around the first segment 308. The first segment bypass pipe 310 is connectable to a three-way flow valve 312. The three-way flow valve 312 has three ports, an M-port, an N-port, and an O-port. The first segment bypass pipe 310 is connectable to the O-port. The N port is connectable to a second segment supply pipe 314 which provides cathode flow to a cathode inlet 316. The M-port is connectable to a branch flow pipe 318, which is in fluid communication with a first segment cathode discharge pipe 320. The first segment cathode discharge pipe 320 in turn is in fluid communication with a cathode outlet of the first segment 308 at a first end, and with the upstream end of an isolation valve 324 on a second end. A downstream end of the isolation valve 324 is connectable to a cathode discharge pipe 326 which is in fluid communication with a second segment cathode discharge pipe 328. The second segment cathode discharge pipe 328 is connectable to a cathode outlet 330 of a second segment 332.

To provide a series cathode flow to the first segment 308 and the second segment 332, the isolation valve 324 is shut and the three-way flow valve 312 is positioned to provide flow between flow ports M to N (blocking flow from the flow O-port). Cathode flow enters the first segment 308 through the first segment inlet pipe 304, traverses the first segment as described herein in reference to FIG. 2, and exits the first segment 308 in the first segment cathode discharge pipe 320. From the first segment cathode discharge pipe 320 flow is blocked by the shut isolation valve 324, which forces flow through the branch flow pipe 318, through flow ports M and N of the three-way flow valve 312, into the second segment supply pipe 314, and into the cathode inlet 316 of the second segment 332. The cathode flow traverses the second segment 332 and discharges into the second segment cathode discharge pipe 328.

To provide a parallel cathode flow to the first segment 308 and the second segment 332, the isolation valve 324 is opened and the three-way flow valve 312 is positioned to provide flow between flow ports 0 to N (blocking flow from the M-port). Cathode flow splits between the first segment inlet pipe 304 and the first segment bypass pipe 310. A first portion of the cathode flow enters the first segment 308 through the first segment inlet pipe 304, traverses the first segment as described herein in reference to FIG. 2, and exits the first segment 308 in the first segment cathode discharge pipe 320. From the first segment cathode discharge pipe 320, the first portion of the cathode flow traverses the isolation valve 324, and flows through the cathode discharge pipe 326 to discharge from the fuel cell stack 300. A second portion of the cathode flow traverses the first segment bypass pipe 310, the flow ports 0 and N of the three-way flow valve 312, and through the second segment supply pipe 314 enters the second segment 332. The second portion of the cathode flow then traverses the second segment 332 and discharges from the second segment 332 into the second segment cathode discharge pipe 328 where it joins with the first portion of the cathode flow in the cathode discharge pipe 326 to discharge from the fuel cell stack 300.

As best detailed in reference to FIG. 6, the fuel cell stack 300 further includes piping and valves which are configurable to provide either series or parallel anode flow through a two segment stack. An anode supply pipe 402 supplies anode flow to a first segment inlet pipe 404, which is connectable to an anode inlet 406 of the first segment 308. The anode supply pipe also supplies anode flow to a first segment bypass pipe 410 which can provide a partial bypass anode flow around the first segment 308. The first segment bypass pipe 410 is connectable to a three-way flow valve 412. The three-way flow valve 412 has three ports, a P-port, a Q-port, and an R-port. The first segment bypass pipe 410 is connectable to the R-port. The Q-port is connectable to a second segment supply pipe 414 which provides cathode flow to an anode inlet 416. The P-port is connectable to a branch flow pipe 418, which is in fluid communication with a first segment anode discharge pipe 420. The first segment anode discharge pipe 420 in turn is in fluid communication with an anode outlet 422 of the first segment 308 at a first end, and with the upstream end of an isolation valve 424 on a second end. A downstream end of the isolation valve 424 is connectable to an anode discharge pipe 426 which is in fluid communication with a second segment anode discharge pipe 428. The second segment anode discharge pipe 428 is connectable to an anode outlet 430 of the second segment 332.

To provide a series anode flow to the first segment 308 and the second segment 332, the isolation valve 424 is shut and the three-way flow valve 412 is positioned to provide flow between flow ports P to Q (blocking flow from the flow R-port). Anode flow enters the first segment 308 through the first segment inlet pipe 404, traverses the first segment 308 as described herein in reference to FIG. 2, and exits the first segment 308 in the first segment anode discharge pipe 420. From the first segment anode discharge pipe 420 flow is blocked by the shut isolation valve 424, which forces flow through the branch flow pipe 418, through flow ports P and Q of the three-way flow valve 412, into the second segment supply pipe 414, and into the anode inlet 416 of the second segment 332. The anode flow traverses the second segment 332, discharges into the second segment anode discharge pipe 428 and into the anode discharge pipe 426 to discharge from the fuel cell stack 300.

To provide a parallel anode flow to the first segment 308 and the second segment 332, the isolation valve 424 is opened and the three-way flow valve 412 is positioned to provide flow between flow ports R to Q (blocking flow from the P-port). Anode flow splits between the first segment inlet pipe 404 and the first segment bypass pipe 410. A first portion of the anode flow enters the first segment 308 through the first segment inlet pipe 404, traverses the first segment 308 as described herein in reference to FIG. 2, and exits the first segment 308 in the first segment anode discharge pipe 420. From the first segment anode discharge pipe 420, the first portion of the anode flow traverses the isolation valve 424, and flows through the anode discharge pipe 426 to discharge from the fuel cell stack 300. A second portion of the anode flow traverses the first segment bypass pipe 410, the flow ports R and Q of the three-way flow valve 412, and through the second segment supply pipe 414 enters the second segment 332. The second portion of the anode flow then traverses the second segment 332 and discharges from the second segment 332 into the second segment anode discharge pipe 428 where it joins with the first portion of the anode flow in the anode discharge pipe 426 to discharge from the fuel cell stack 300.

As best shown in FIG. 7, the fuel cell stack 300 of FIG. 5 further includes piping which is configurable to provide parallel coolant flow through a two segment stack. A coolant supply pipe 500 is splits to supply both a first segment supply pipe 502 and a second segment supply pipe 504. The first segment supply pipe 502 is connectable to the first segment 308 at a coolant inlet 506. A coolant outlet 508 is connectable to a first segment coolant discharge pipe 510, which joins a coolant discharge pipe 512. The second segment supply pipe 504 is connectable to the second segment 332 at a coolant inlet 514. A coolant outlet 516 is connectable to a second segment coolant discharge pipe 518, which joins with the first segment coolant discharge pipe 510 at the coolant discharge pipe 512.

A first portion of coolant from a coolant supply source splits to flow from the coolant supply pipe 500 into the first segment supply pipe 502, traverses the first segment 308, and exits into the first segment coolant discharge pipe 510. From the first segment coolant discharge pipe 510, the first portion of the coolant flows into the coolant discharge pipe 512 to exit the fuel cell stack 300. A second portion of the coolant from the coolant supply source splits to flow from the coolant supply pipe 500 into the second segment supply pipe 504, traverses the second segment 332, and exits into the second segment coolant discharge pipe 518. From the second segment coolant discharge pipe 518, the second portion of the coolant combines with the first portion of the coolant in the coolant discharge pipe 512 to exit the fuel cell stack 300.

Figure 8:
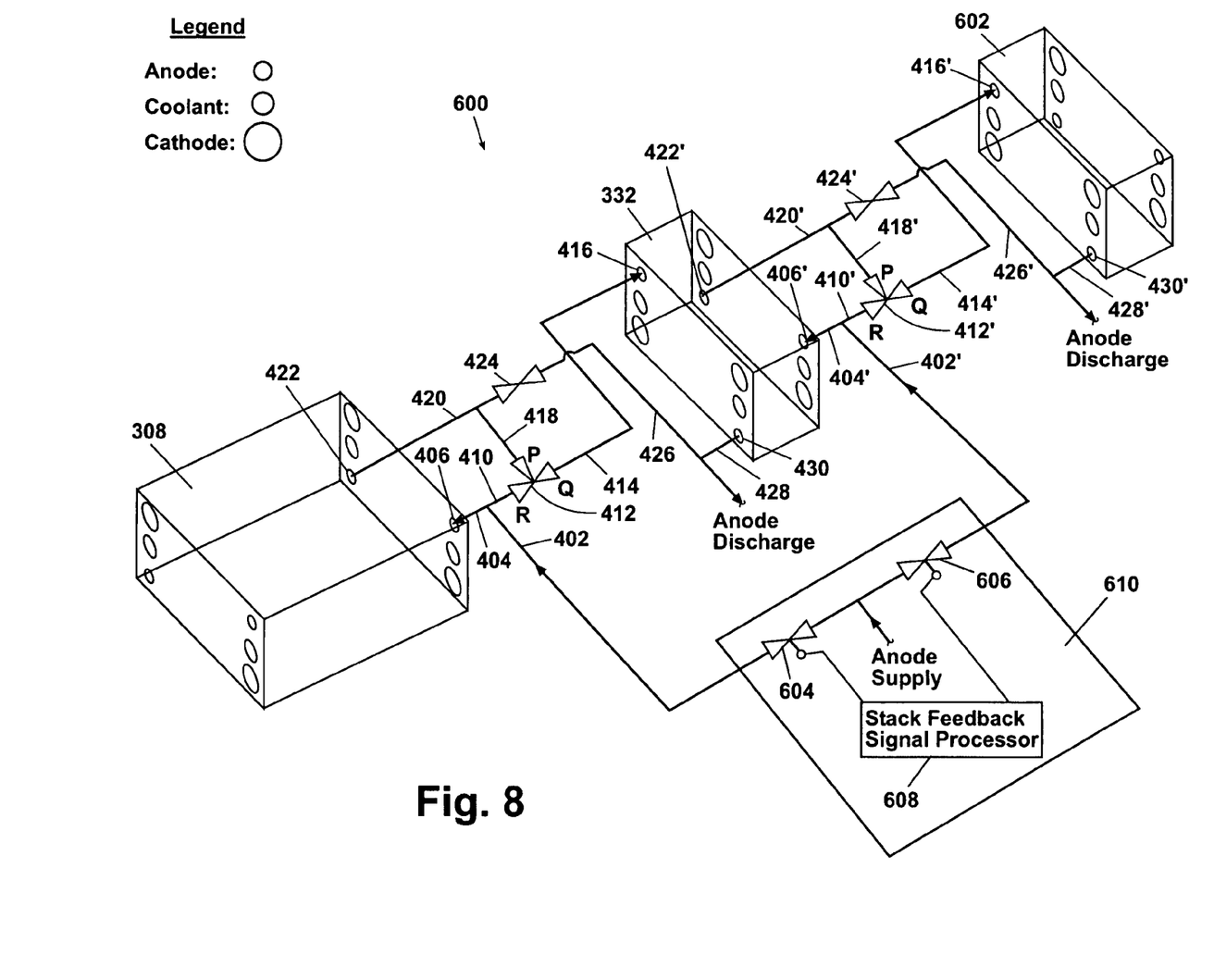
FIG. 8 is a perspective view of a 3-segment fuel cell stack according to another preferred embodiment of the present invention, identifying a stack feedback system signaling a pair of anode flow control valves.

Referring to FIG. 8, a fuel cell stack 600 is shown which is based on the fuel cell stack 300 of FIG. 6 having an additional, third segment 602. Piping and valves to the third segment 602 are based on the piping and valves of FIG. 6, showing prime numbers to indicate the new piping and valves joining the second segment 332 with the third segment 602. FIG. 8 also shows an anode control valve 604 upstream of the anode supply pipe 402, and an anode control valve 606 upstream of an anode supply pipe 402'. Both the anode control valve 604 and the anode control valve 606 receive control signals from a stack feedback signal processor 608. The anode control valves 604, 606, the associated piping, and the stack feedback signal processor 608 together form a variable control system 610. The stack feedback signal processor 608 provides valve position signals based on exemplary stack feedback data forwarded to the variable control system 610, including stack or segment pressure drop, stack voltage (e.g., total, range, and standard deviation), and exit reactant(s) concentration. Stack reactant and/or coolant flow can be redirected by repositioning the anode control valves 604 and 606, or by similar cathode control valves (not shown) and coolant control valves (not shown). Commonly available processors and components are used for the stack feedback system 608 and the variable control system 610. The anode control valves 604, 606 can be any of a commonly available type of control valve, including solenoid actuated valves, motor controlled throttling valves, etc., capable of receiving electrical signals from the stack feedback system 608.

The quantity of fuel cells within each segment is adjustable. The reactant flow passes through each cell of each segment wherein the reactant is gradually depleted through each segment, and for any given total inlet and outlet flow the stoichiometry of each segment of the multi-segment stack is higher than in a single stack where all cells are fed in parallel.

Water which forms as a reaction product in each individual reactant segment is collectively drained at the base of its associated separator segment or by drain collection points in the individual flow pipes located between segments. This water volume is discharged through drain lines (not shown) to a discharge point in the stack. This ensures that the water formed in each segment of the stack drains in a gravity assisted direction toward the gravity drain points at the base of each separator segment, or associated with each flow pipe, and therefore provides an efficient removal method for water generated in the stack.

In a preferred embodiment, a further advantage is provided by using parallel coolant flow wherein the cathode and anode inlet streams are separated between segments. The coolant will increase in temperature as it passes through the stack, and will provide improved relative humidity control when it is desirable to split the cathode and anode stack entrance locations. The advantage of parallel coolant flow is that coolant at its lowest temperature enters the stack at the point where each reactant gas enters the stack, providing the maximum reactant gas temperature drop and therefore the lowest humidity for the inlet gas. Providing the lowest temperature for the entering reactant gas reduces its dew point and requires very little water vapor production to achieve the desired 100% relative humidity for reactant gas stream flow through the stack. It is normally desirable to provide 100% relative humidity (RH) in each segment of the stack because water is continuously being generated and excess water (vapor) hinders flow and hydrogen contact with the fuel cells.

Where separator channels are located in separator segments between stack segments, channel temperature is automatically controlled by coolant temperature. The gas temperature in any of the separator channels will therefore adjust to the coolant temperature until water vapor within the separator channels reaches the channel/coolant due point temperature and any water vapor above the due point temperature of the coolant will drop out to the separator drain. An advantage of this "automatic" temperature control is that the reactant gas entering each successive segment is at about 100% RH, providing saturated flow to each segment. This eliminates the need to provide additional external temperature control for each segment. As the fuel is reacted in each individual segment, the average temperature of the flow rises from one segment to the next and the relative humidity is retained at about 100% RH.

The effect of non-consumed inert gas flow on an overall stack pressure drop is greatly reduced by using a "substantially pure hydrogen" system of the present invention. As defined herein, "substantially pure hydrogen" is an anode reactant containing approximately 80% by volume or greater portion of hydrogen, and approximately 20% by volume or less portion of inert gas(es). Only the hydrogen is consumed (forming water and generating electrical current) by the fuel cell stack, therefore the approximately 20% by volume or less of non-consumed inert gas flows through the stack. By using a pure hydrogen anode reactant, the 20% or lower volume of inert gas generally does not control the pressure drop across the successive segments of the stack. Therefore, flow through the stack segments can be varied to optimize the stack stoichiometry.

The fuel cell stack of the present invention provides several advantages. Each segment of the fuel cell stack of the present invention provides gravity assisted reactant and water drain flow. Where a separator segment is disposed between each segment pair, the separator segment(s) efficiently removes water from the stack as well as controls humidity within the stack. By providing parallel flow within each segment and providing individual segments of different quantities of fuel cell elements, the present invention permits a fuel cell stack to operate at varying stoichiometries between individual segments and provide a higher operating efficiency. The average voltage output of a fuel cell stack of the present invention will be increased over a fuel cell stack having total parallel flow through only one segment of elements. Reactant distribution is improved from cell to cell within the stack segments and from channel to channel within the fuel cell plates. Improving reactant distribution by removing water more efficiently (using gravity assisted flow in the fuel cells) provides an increased voltage in the segment(s) where hydrogen concentration is the highest.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack comprising:
   a first fuel cell segment and a second fuel cell segment sequentially arranged;
   a plurality of fuel cells disposed in each of said first and second fuel cell segments, each of said plurality of fuel cells having an anode passage, a cathode passage and a membrane electrode assembly interposed therebetween, said anode passage and said cathode passage being oriented in a unidirectional, gravity-assisted flow orientation; and
   a valve and piping manifold assembly positioned between and providing fluid communication between said first fuel cell segment and said second fuel cell segment, said manifold assembly being configurable between said anode and cathode passages of said first fuel cell segment and said anode and cathode passages of said second fuel cell segment to form one of a counter-current flow arrangement of said anode and cathode passages of said fuel cells within said fuel cell stack to provide counter-current flow and a parallel flow arrangement of said anode and cathode passages of said fuel cells within said fuel cell stack, to provide parallel flow,
   wherein each of said fuel cell segment further comprises:
      an anode inlet chamber arranged above an anode outlet chamber, both said anode inlet chamber and said anode outlet chamber in fluid communication with said anode passages; and
      a cathode inlet chamber arranged above a cathode outlet chamber,
   both said cathode inlet chamber and said cathode outlet chamber in fluid communication with said cathode passages,
   wherein said manifold assembly further comprises:
      a generally upwardly oriented anode supply pipe providing fluid communication between said anode inlet chambers of both said first segment and said second segment;
      a generally downwardly oriented anode discharge pipe providing fluid communication between said anode outlet chambers of both said first segment and said second segment;
      a generally upwardly oriented cathode supply pipe providing fluid communication between said cathode inlet chambers of both said first segment and said second segment; and
      a generally downwardly oriented cathode discharge pipe providing fluid communication between said cathode outlet chambers of both said first segment and said second segment,
   and wherein the fuel cell stack further comprises:
      a plurality of coolant passages disposed adjacent to said plurality of fuel cells within each of said first and second segment;
      a coolant inlet chamber disposed in each of said first and second fuel cell segments and in fluid communication with said plurality of coolant passages; and
      a coolant outlet chamber disposed in each of said first and second fuel cell segments and in fluid communication with said plurality of coolant passages.

2. The fuel cell stack of claim 1, wherein said manifold assembly further comprises:
   a coolant supply pipe providing fluid communication between said coolant inlet chambers of said first and second fuel cell segments; and
   a coolant discharge pipe providing fluid communication between said coolant outlet chambers of said first and second fuel cell segments.

3. The fuel cell stack of claim 2, further comprising:
   a cathode inlet disposed on said first fuel cell segment in fluid communication with said cathode inlet chamber of said first fuel cell segment;
   an anode inlet disposed on said first fuel cell segment in fluid communication with said anode inlet chamber of said first fuel cell segment;
   said first fuel cell segment having a coolant inlet adjacent to said cathode inlet; and
   wherein said manifold assembly is configurable such that said coolant inlet, said cathode inlet and said anode inlet form a parallel flow arrangement of said coolant passages relative to both said plurality of cathode passages and said plurality of anode passages of said fuel cells of said fuel cell stack.

4. The fuel cell stack of claim 2, further comprising:
   a cathode inlet disposed on said first fuel cell segment in fluid communication with said cathode inlet chamber of said first fuel cell segment;
   an anode inlet disposed on said second fuel cell segment in fluid communication with said anode inlet chamber of said second fuel cell segment;
   said first fuel cell segment having a coolant inlet adjacent to said cathode inlet; and
   wherein said manifold assembly is configurable such that said coolant inlet and said cathode inlet form a parallel flow arrangement of said coolant passages relative to said plurality of cathode passages of said fuel cell stack, and said plurality of cathode passages form a counter-current flow arrangement with said plurality of anode passages.

5. The fuel cell stack of claim 2, wherein said manifold assembly further comprises:
   a multi-outlet-port valve disposed in said anode supply pipe to selectively supply said anode inlet chambers of both said first segment and said second segment;
   a multi-outlet-port valve disposed in said cathode supply pipe to selectively supply said cathode inlet chambers of both said first segment and said second segment;
   a multi-outlet-port valve disposed in said coolant supply pipe to selectively supply said coolant inlet chambers and said coolant outlet chambers of said first and second segments.

6. The fuel cell stack of claim 2, further comprising:
a cathode inlet disposed on said first segment in fluid communication with said cathode inlet chamber of said first segment;
an anode inlet disposed on said second segment in fluid communication with said anode inlet chamber of said second segment;
said first segment having a first segment coolant inlet adjacent to said cathode inlet;
said second segment having a second segment coolant inlet adjacent to said anode inlet; and
said first segment coolant inlet and said second segment coolant inlet form a parallel coolant flow path between said first segment and said second segment of said fuel cell stack, and said cathode passages form said counter-current flow arrangement with said anode passages.

7. The fuel cell stack of claim 6, wherein said second coolant inlet forms a parallel coolant path relative to said cathode passage.

8. The fuel cell stack of claim 6, wherein said second coolant inlet forms a parallel coolant path relative to said anode passage.

9. The fuel cell stack of claim 1, wherein a quantity of fuel cells within each said segment decreases between successive segments from an inlet portion of the stack to an outlet portion of the stack.

* * * * *